United States Patent [19]

Hermesmeyer

[11] Patent Number: 5,263,006
[45] Date of Patent: Nov. 16, 1993

[54] DEVICE AND PROCESS FOR DETECTING THE PRESENCE OF A VEHICLE BY MEANS OF AN ULTRASONIC DEVICE

[76] Inventor: Alexander C. Hermesmeyer, Römerstrasse 6, D-5170 Jülich, Fed. Rep. of Germany

[21] Appl. No.: 867,703

[22] PCT Filed: Jan. 4, 1991

[86] PCT No.: PCT/DE91/00001
§ 371 Date: Jul. 7, 1992
§ 102(e) Date: Jul. 7, 1992

[87] PCT Pub. No.: WO91/10920
PCT Pub. Date: Jul. 25, 1991

[30] Foreign Application Priority Data

Jan. 12, 1990 [DE] Fed. Rep. of Germany ....... 4000698

[51] Int. Cl.⁵ .................. G01S 15/87; G01S 15/04; G01S 7/52
[52] U.S. Cl. ........................... 367/117; 367/93
[58] Field of Search .................. 367/87, 93, 96, 105, 367/909, 117, 88

[56] References Cited

U.S. PATENT DOCUMENTS

| Re. 30,719 | 8/1981 | Mills | 367/96 |
| 4,403,311 | 9/1983 | Tournois | 367/88 |
| 4,458,342 | 7/1984 | Tournois | 367/88 |
| 4,706,227 | 11/1987 | DuVall et al. | 367/96 |

Primary Examiner—Daniel T. Pihulic
Attorney, Agent, or Firm—K. S. Cornaby

[57] ABSTRACT

A device for detecting the presence of a vehicle by means of an ultrasonic device has an ultrasonic sensor (22) associated with an electronic transmitting and receiving circuit (28, 30). The sensor (22) emits periodic pulses whose reflections are received and evaluated by the circuit (28, 30). A positive presence signal is emitted if reflections are present. To ensure that a positive presence signal is always obtained irrespective of the shape of the vehicle and of the part of vehicle which has just been identified, the ultrasonic device has a central sensor (22) and two external sensors (26, 28) situated equidistant from the latter and at the maximum possible distance apart. The external sensors (25, 26) are connected identically and operated on a par with each other. Either the central sensor (22) is connected as the receiving sensor and the external sensors (24, 26) as the emitting or vice versa.

18 Claims, 1 Drawing Sheet

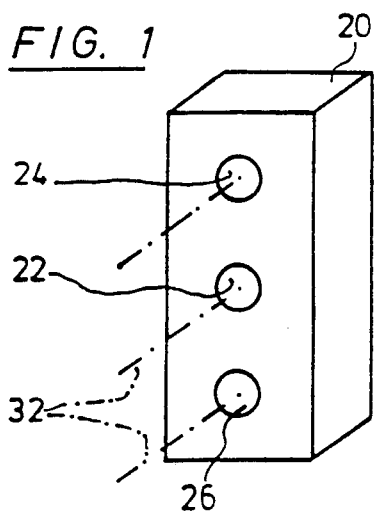
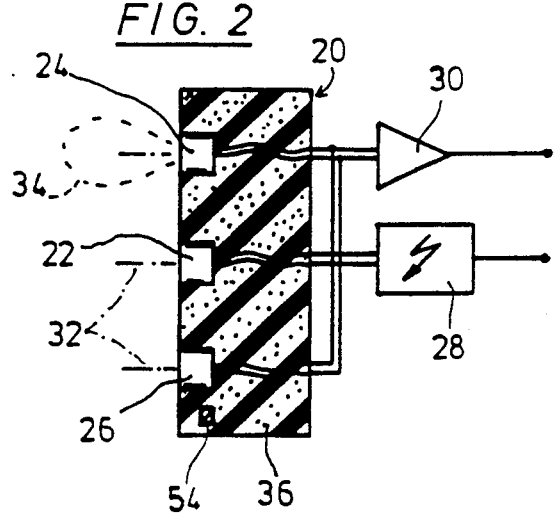
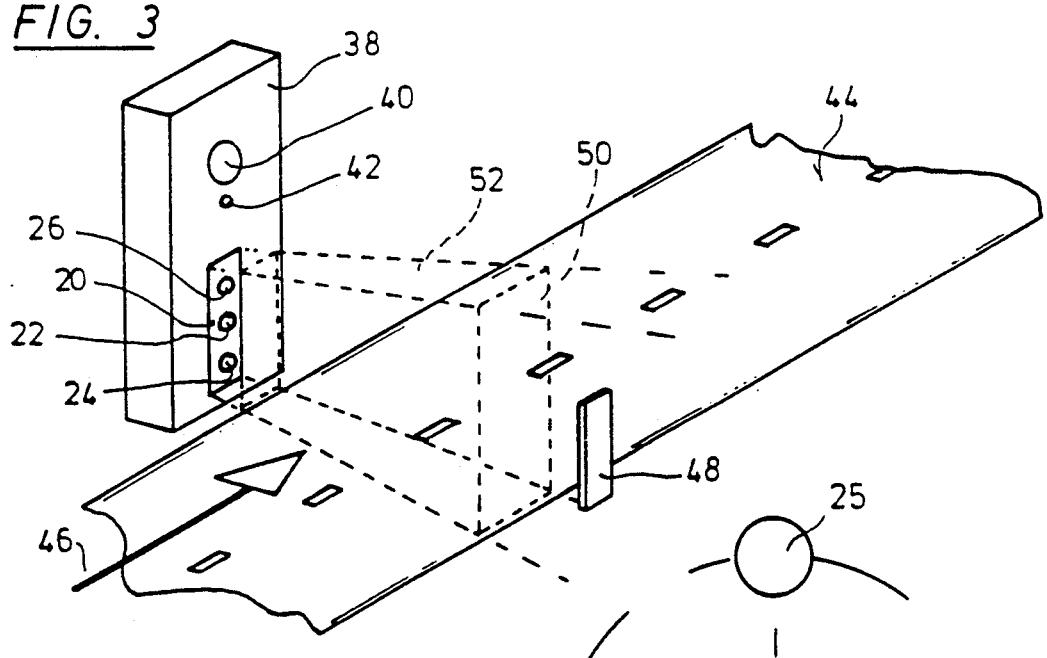

DEVICE AND PROCESS FOR DETECTING THE PRESENCE OF A VEHICLE BY MEANS OF AN ULTRASONIC DEVICE

The invention pertains to a device and process for detecting the presence of a vehicle by means of an ultrasonic device. This device incorporates an ultrasonic sensor and an associated electronic transmitting and receiving circuit in which ultrasonic impulses are transmitted periodically from the sender. The reflections of these impulses are received and evaluated by the circuit. A positive presence signal is emitted if after transmission of an impulse a reflection is received within a certain period of time.

A device and a process for determining, by means of ultrasonics, spaces between objects in the air are already familiar from German Patent Document DE-A-36 21 819. In this device, which is also employed for determining the presence of vehicles, an ultrasonic impulse is periodically transmitted from the sensor in accord with the impulse-reflection process, and the reflections are received by the same sensor.

With this well-known device problems occur in ascertaining the presence of vehicles when, independently of the shape of the vehicle, especially automobiles, a positive signal is to be emitted constantly and without fail when the vehicle is sighted a certain distance from the device. The present state of the art with respect to this device does not always guarantee that certain parts of a vehicle that are set at an angle—in the vicinity of air ducts or tires, for example—send back an adequate image to the sensor, thereby rendering it possible that the presence of a vehicle, especially an automobile, is not always detected.

In addition to ultrasonic devices, other devices for determining the presence of vehicles are known. There are, for example, devices that work inductively in which an activating strip is laid under the surface of the road. There are also both passive and active infrared sensors, radar devices, and so on. But these devices too do not always determine with absolute accuracy the presence of a vehicle, or they have other disadvantages. Where sensing strips are laid under the surface, problems occur when the road surface is wet. These problems are acute when there is a sudden downpour. With infrared devices the presence of sunlight when the sun is in certain positions can lead to faulty signalling. A too weak signal can be transmitted from certain vehicles, but especially from dark colored passenger vehicles. Thus, the presence of a vehicle may not always be registered accurately. Again, radar devices are relatively expensive, although on the whole they accurately record the presence of vehicles.

The purpose of the present device is to signal the presence of a vehicle so long as that vehicle, especially any motorized vehicle, remains in a certain area. It is intended for all areas in which a vehicle is present in a given area—such as a traffic lane—and for which humans or a machine are to be informed that a vehicle is positioned within the given area. Thus the device could be implemented at drive-in counters, entry and exit points on toll roads, bridges and the like, order boards at fast food restaurants, and so on. In all such applications the device is required not merely to emit an impulse, as such devices are required to do when traffic passes (for example, at traffic lights situated at intersections, or when traffic density is to be determined; on such occasions the exact distance between the device and vehicle is of little consequence); on the contrary, its application is especially suited to situations whenever it is essential that the presence of a vehicle be accurately signalled as long as the vehicle is present, either wholly or in part, within a predetermined area.

In consequence of these requirements, and proceeding from the already familiar process and the already familiar device as designated in the opening remarks, the purpose of the invention is to improve on the already familiar device and or respectively process so that, independently of the shape and configuration of the vehicle, positive notification of the presence of a vehicle is provided with absolute certainty whenever and as long as a vehicle is present within an area monitored by the ultrasonic device.

This purpose is achieved in accord with the characteristics of the device by placing a sensor in a central position and arranging, equidistant from this central sensor and as far from it as possible, at least two additional sensors so that the external sensors are connected identically and operated on a par with each other. Either the central sensor is connected as the receiving sensor and the external sensors as the emitting sensor or vice versa. The basis of the invention is the characteristic that each sensor in a spatial realm receives or respectively transmits along a cone. The two transmitting sensors or respectively (in the alternate version) the two receiving sensors ensure that reflections even from inclined surfaces in the vicinity of ventilation ducts, the vicinity of mudguards, door handles, tires and so on, are recorded. Thus, the invention is not dependent on receiving an echo from as large a surface area as possible that is situated exactly at right angles to the main impulse/beam that is emitted from at least one of the chief emitting sensors. On the contrary, in the arrangement pertinent to the invention, the main impulse is almost never reflected in the main direction of reception of a receiving sensor. However, in this way peripheral signals which were not received by devices of the kind already familiar, are recorded, thereby enabling reflections from angled surfaces to be recorded, which were not detected by prior art devices.

As the sensors are divided into transmitting and receiving sensors, and as the sensors are separated spatially, a direct and immediate coupling of the transmitted signal into the receiving canal is avoided. In this way the reception circuitry is simplified and its presence does not have to be intrusive. Thus, the reliability and accuracy of the receiving canal can be improved.

In a further development of the invention it is proposed that the chief directions of the main impulse of all sensors be arranged parallel to one another. Such an arrangement would incorporate exclusively non-central transmitting or respectively receiving impulses so that the whole device could be tuned right from the beginning to operate at very high sensitivity, as mirror reflections of the main impulses are not be expected.

In a further development the minimum three sensors would be arranged in a common housing and bedded in an elastic mass that did not resonate at the frequencies employed. In this way the mechanical part of the invention could be arranged and implemented with simplicity.

In addition, it is suggested that the distance from the external sensors to the central sensor be at least 5%, and preferably 10%, of the distance to the area in which the vehicles whose presence is to be detected are expected.

The greater the gap between the sensors the more certain the device is to register inclined surfaces, that is body parts that are situated at an angle to the direction of the main impulse sent from the transmitting sensors. The device constructed in accord with the invention always reacts to only a part of a whole vehicle. Over the distances noted above, reflection is achieved from the configurations of the frames or respectively bodies of the motorized vehicles. The distances cited are especially suited to detecting the presence of a vehicle from the side (at right angles to the direction of travel). The arrangement ensures that bicycle and motor bike riders, persons on small scooters and the like are detected.

In this arrangement in which the device is arranged at the side of the vehicles to be detected ("at the side" is to be understood as not situated in the traffic lane in which the vehicles are present), the device is cited between 20 and 80 cm, but ideally 40 to 60 cm, above the surface on which the vehicles are situated. Operating within this range ensures with certainty that the presence of all common vehicles will be detected.

In versions incorporating two external sensors, that is three sensors in all, the sensors, in an ideal further development of the invention, can be arranged vertically one over the other. Such an arrangement is possible because, on most common vehicles, angles or respectively curved body parts and other parts typically are arranged parallel to the direction of travel of the vehicle and less frequently at an angle to the direction of travel.

Finally it has proved advantageous, on the other side of the area in which the presence of a vehicle is to be detected and outside the parameters of the traffic lane, to arrange, in the direction of the main impulse, a reflector that always transmits a reflection whenever there is an object in the area in which the presence of vehicles is to be detected. The echo received from this reflector differs from the echoes received from vehicles whose presence is to be detected by reason of the fact that it is received at a later instant. The reflector makes it possible to check on the device constantly. In addition, it is possible to compensate automatically for changes in input factors, for example, during rain, when there is increased condensation when the sensors are soiled, and when individual components age.

In an ideal version of a further development it is proposed that, alternately and especially periodically, the external sensors be used as transmitters and the centrally installed sensor be used as receiver; also that the external sensors be used as receivers and the centrally installed sensor be used as receiver. In this way, varying the physical or electrical characteristics of the component parts can be compensated for and the certainty of detection be improved.

Further advantages and characteristics result from the remaining claims as well as from the following description of versions of the invention. These versions are not to be understood as limiting in any way the application and are described more closely with reference to the diagrams.

BRIEF DESCRIPTION OF THE DRAWINGS

FIG. 1 shows in perspective the arrangement of a sensor housing;

FIG. 2 a cross section through the sensor housing along the line II—II in FIG. 1;

FIG. 3 in perspective the arrangement of a device constructed in accord with the invention and installed to the side of a traffic lane; and FIG. 4 a plan view of an arrangement involving a total of four sensors.

FIGS. 1 to 3 show a first version of the device for detecting the presence of a vehicle using ultrasonic sensors. Three sensors for ultrasonic detection are arranged vertically one over the other and equidistant from one another. In a housing 20, there is a sensor arranged in the middle 22 and one above and below 24, 26. The distance between centers is in each instance 69 mm. Piezo reflectors which work at a frequency of 40 KHz and which are readily available commercially were used as sensors 22 to 26.

As the schematic representation in FIG. 2 shows the sensor mounted centrally 22 is used as the transmitter, it is linked to a transmitting circuit 28. The two external sensors 24, 26 are connected identically in the example here illustrated and connected to the initial booster of a receiving channel that is not shown in this figure.

In an alternative construction, both the external sensors 24, 26 are linked with the sender circuit 28 and function as transmitting sensors. The central sensor 22 is in this instance responsible for receiving the reflected ultrasound signals, and is linked with the input amplifier 30. This alternative is not represented in the diagram.

In a model constructed in accord with FIGS. 1 to 3, the front surfaces of the three sensors 22 to 26 are cited in the same plane. The chief directions of their impulses 32, which proceed vertically from each of the front surfaces, run parallel to one another. Each sensor 22 to 26 has an emission cone 34 which, in greatly reduced scale, is suggested in the shaded area in FIG. 2. In terms of the invention the impulse cones of neighboring sensors overlap.

The sensors 22 to 26 are imbedded in an elastic mass 36, which affords them some mechanical stability in that it encloses them up to their front surfaces. On the other hand, it also allows some vibration. A pourable sealing compound made of synthetic/plastic that, when finished, has a Shore-strength of 40, is used as the bedding mass 36. The sensors 22 to 26 are attached electrically with flexible wires, ideally by means of braided loops.

FIG. 3 shows the arrangement of a housing constructed in accord with FIGS. 1 to 3 that is mounted in a communication column 38, such as for example would be required for customers to place their orders at fast food restaurants. Incorporated in it are at the height of the window of a car a loud speaker and a mouthpiece 40 and a communication switch 42. Below that and linked to the surface is arranged in accord with FIGS. 1 and 2 the housing 20. It is 170 mm high and 70 mm wide. The three sensors 22 to 26 are recognizable.

The communication column 38 is cited to the side of a traffic lane 44 for the vehicles to be detected. The centrally mounted sensor 22 is placed approximately 40 cm above the surface of the traffic lane, and the direction of its main impulse runs parallel to the surface of the traffic lane 44 and at right angles to the direction of travel 46. On this direction of travel of the main impulse 32 a reflector 48 is cited on the other side of the traffic lane 44 directly opposite the communication column 38. More reference will be made to this reflector later.

The shaded lines which proceed from the front side of the housing 20 suggest the possible area of detection 50 of the device constructed in accord with the invention. Objects which are cited within the designated zone can be detected. Additional devices which include familiar electronic devices, for example a time gate, ensure that only such reflections of a transmitted impulse that result in reflection within the given detection area 52 are registered. It is possible to dispense with the temporal limit to the housing 20, but it is not possible to dispense with the temporal limit to longer periods of time. Thus, it is possible to avoid registering the presence of vehicles that are to be found on other lanes, as for example on a second lane that lies to the right of the traffic lane 44 in FIG. 3. Finally, it is possible to incorporate an amplitude threshold which ensures that only larger sized objects which provide a sufficiently large signal are actually registered. In this way it is possible to ensure that smaller objects do not activate the system. In order to eliminate malfunctions and ensure that quickly moving, small objects such as birds do not activate the process the requirement that transmission be activated by several impulses is incorporated in the electronic display circuit so that, when one or only a few activating signals are transmitted, the device does not signal the presence of a vehicle.

The reflector 48 provides outside the time domain of the identification region 42 an echo that constantly arrives at a prearranged time at the two sensors 24, 26. A separate time window is incorporated for its evaluation. By reason of the echo from the reflector 48 it is possible to monitor constantly and automatically the whole device. Distortions due to the aging of individual components can be compensated for in that, when the impulse for example decreases in strength, the transmission value is increased. In addition, after a given number of echoes that originate from the reflector 48 have been received, the device can be switched to an at-rest mode, in which, for example, the frequency at which ultrasonic signals are transmitted by the centrally mounted sensor 22 is reduced, for example, to a quarter. This reduction is discarded as soon as an object is sensed within the area of detection 52.

Within housing 20 there is a heating unit 54, for example, a transistor that is activated when the temperature drops. A steering device that is not shown and that embraces a temperature sensor in the housing 20 is incorporated in this heating unit. Thus, the temperature of the sensors 22 to 26 can be kept above a minimum value independently of variations in the surrounding temperature.

FIG. 4 shows finally the arrangement of three receiving (or in the alternate mode of operation, transmitting) sensors 24, 25, 26, which are arranged in a circular arch around the centrally mounted, transmitting (or in the alternate mode, receiving) sensor 22. The radius of the circular arch on which the external sensors 24 to 26 are arranged is determined by the distance from the housing 20 to the area on which the presence of vehicles is to be detected 52. It amounts to at least 5% of this distance. The external sensors 24 to 26 are arranged at the same angle of pitch around the centrally mounted sensor 22 on the arch to which attention is drawn.

I claim:

1. A device for detecting the presence of a vehicle that is situated on a traffic lane has an ultrasonic device that (a) is mounted to the side of the traffic lane, (b) has a housing in which at least three ultrasonic transducers are arranged and (c) includes an electronic transmitting and receiving circuit that is associated with the said at least three ultrasonic transducers wherein one of the said at least three ultrasonic transducers is mounted centrally in the housing and the other ultrasonic transducers of the said at least three ultrasonic transducers are arranged equidistant and in a distance from the centrally mounted ultrasonic transducer and are electrically interconnected in a configuration which is one of a serial and a parallel connection, with the centrally mounted ultrasonic transducer being operated as a transmitter and emitting periodical ultrasonic pulses whose reflections are received by the said other ultrasonic transducers, which are operated as receivers, and the electronic transmitting and receiving circuit issues a positive presence signal if reflections occur within an area whose extent is determined by the width of the traffic lane and if at least one of the said other ultrasonic transducers picks up these reflections.

2. A device for detecting the presence of a vehicle that is situated on a traffic lane has an ultrasonic device that (a) is mounted to the side of the traffic lane, (b) has a housing in which at least three ultrasonic transducers are arranged and (c) includes an electronic transmitting and receiving circuit that is associated with the said at least three ultrasonic transducers, wherein one of the said at least three ultrasonic transducers is mounted centrally in the housing and the other ultrasonic transducers of the said at least three ultrasonic transducers are arranged equidistant and in a distance from the centrally mounted ultrasonic transducer and are electrically interconnected in a configuration which is one of a serial and a parallel connection, with the centrally mounted ultrasonic transducer being operated as a receiver and the said other ultrasonic transducers being operated as transmitters and emitting periodical ultrasonic pulses whose reflections are received by the said centrally mounted ultrasonic transducer, and the electronic transmitting and receiving circuit issues a positive presence signal if reflections occur within an area whose extent is determined by the width of the traffic lane and if the said centrally mounted ultrasonic transducer picks up these reflections.

3. A device in accord with claim 1, wherein the main directions of transmission and receipt of all ultrasonic transducers run parallel to one another.

4. A device in accord with claim 1, wherein the ultrasonic transducers in their housing are bedded in an elastic mass which is not resonant.

5. A device in accord with claim 1, wherein the distance from each of the external sensors to the centrally mounted sensor is at least 5% to 10% of the width of the area in which vehicles are expected.

6. A device in accord with claim 1, wherein detection occurs in the receiving circuit over several periods.

7. A device in accord claim 1, wherein a time gate is incorporated in the electronic transmitting and receiving circuit whose lower threshold is zero or above and whose upper threshold is less than the time required for sound to traverse the traffic lane and return.

8. A device in accord with claim 1, wherein a total of three ultrasonic transducers are arranged vertically one over the other.

9. A device in accord with claim 1, wherein the centrally mounted ultrasonic transducer is sited 20 to 80 cm above the level of the traffic lane.

10. A device in accord with claim 9, wherein the centrally mounted ultrasonic transducer is sited 40 to 60 cm above the level of the traffic lane.

11. A device in accord with claim 2, wherein the main directions of transmission and receipt of all ultrasonic transducers run parallel to one another.

12. A device in accord with claim 2, wherein the ultrasonic transducers in their housing are bedded in an elastic mass which is not resonant.

13. A device in accord with claim 2, wherein the distance from each of the external sensors to the centrally mounted sensor is at least 5% to 10% of the width of the area in which vehicles are expected.

14. A device in accord with claim 2, wherein the detection occurs in the receiving circuit over several periods.

15. The device in accord with claim 2, wherein a time gate is incorporated in the electronic transmitting and receiving circuit whose lower threshold is zero or above and whose upper threshold is less than the time required for sound to traverse the traffic lane and return.

16. A device in accord with claim 2, wherein a total of three ultrasonic transducers are arranged vertically one over the other.

17. A device in accord with claim 2, wherein the centrally mounted ultrasonic transducer is sited 20 to 80 cm above the level of the traffic lane.

18. A device in accord with claim 17, wherein the centrally mounted ultrasonic transducer is sited 40 to 60 cm above the level of the traffic lane.

* * * * *